Aug. 30, 1966         E. W. VOLAND                3,269,212
               AXIAL SHAFT POSITIONING MEANS
Filed Oct. 28, 1964                          2 Sheets-Sheet 1

INVENTOR.
ELMO W. VOLAND
BY
ATTORNEY

Aug. 30, 1966        E. W. VOLAND        3,269,212
AXIAL SHAFT POSITIONING MEANS
Filed Oct. 28, 1964                           2 Sheets-Sheet 2

INVENTOR.
ELMO W. VOLAND
BY
ATTORNEY

United States Patent Office 3,269,212
Patented August 30, 1966

3,269,212
AXIAL SHAFT POSITIONING MEANS
Elmo W. Voland, Indianapolis, Ind., assignor to P. R. Mallory & Co., Inc., Indianapolis, Ind., a corporation of Delaware
Filed Oct. 28, 1964, Ser. No. 407,160
10 Claims. (Cl. 74—504)

This invention relates generally to a means and method for axially positioning a shaft, more particularly to a device for indexing an axially displaceable rotary shaft in any one of a plurality of axial positions.

Although the present invention is adaptable to a variety of uses, it finds particular utility in control timer mechanisms. Those familiar with the control timer art will recognize the need for a means that axially positions the shaft of the control timer mechanism to thereby provide a means and method of actuating a line switch means. It is desirable to have axial displacement of the control timer shaft between established axial limits. The retaining means of the shaft must be sufficiently rigid to maintain proper positioning of the shaft while minimizing the drag torque resulting from the shaft contacting the retaining means and as the shaft is axially positioned to present a minimum amount of resistance thereto.

One means of shaft positioning known to the control timer art utilized a "hairpin" spring fixedly coupled to a pair of mounting studs. The mounting studs are fixedly coupled to a mounting plate of a control timer. The "hairpin" spring is mounted in a plane that is perpendicular to the longitudinal axis of the timer shaft. Extremities or fingers of the "hairpin" spring engage one of the plurality of circumferential grooves cut in the periphery of the timer shaft. The fingers are spring biased against the shaft thereby maintaining the shaft in a desired axial position. To alter the axial position of the shaft, the shaft is pushed or pulled to thereby change the axial position of the shaft. Such a device, although effective for its intended purpose, requires either that the shaft be axially positioned manually to actuate a line switch which energizes the control timer or that a cam operated switch be cooperatively associated with the shaft to actuate the control timer to an "off" position while the shaft maintains its axial position and the line switch is maintained in an "on" position.

In contradistinction to the aforementioned device, the present invention utilizes a ramp means that cooperates with a pin to axially displace a shaft and hence automatically actuate a line switch to an "off" position after the shaft has been rotated through a predetermined arcuate displacement. The present invention thereby eliminates the need for aforementioned cam operated switch. The axial displacement of the shaft is accomplished with minimum drag developed between the circumferential grooves of the shaft and the fingers of the "hairpin" spring due to the unique cooperation between the extremities of the "hairpin" spring engaging the groove and the ramp means.

It is an object of the present invention to provide an axial shaft positioning means adapted to afford substantially a drag free axial displacement.

Another object of the present invention is to provide an axial shaft positioning means maintaining a desired axial location on a shaft with minimum resistance to rotational and axial displacement of the shaft.

Yet another object of the present invention is to provide an axial shaft positioning means utilizing cooperation between a novel ramping means and a pin to axially displace a shaft.

Still another object of the present invention is to provide and axial shaft positioning means that is easily fabricated and assembled at low cost.

Another object of the present invention is to provide an axial shaft positioning means possessing improved operating characteristics.

A further object of the present invention is to provide a simple, efficient, and practical axial shaft positioning means.

Yet another object of the present invention is to provide an axial shaft positioning means that eliminates the need for a cam actuating switch to deactivate an operating control timer.

The present invention, in another of its aspects, relates to novel features of the instrumentalities described herein for teaching the principal object of the invention and to the novel principles employed in the instrumentalities whether or not these features and principles may be used in the said object and/or in the said field.

With the aforementioned objects enumerated other objects will be apparent to those persons possessing ordinary skill in the art. Other objects will appear in the following description, appended claims, and appended drawing. The invention resides in the novel construction, combination, arrangement, and cooperation of elements as described and more particularly as defined in the appended claims.

The appended drawings illustrate several novel and different embodiments of the present invention constructed to function in the most advantageous modes devised for the practical application of the basic principles involved in the hereinafter described invention.

Figure 1:
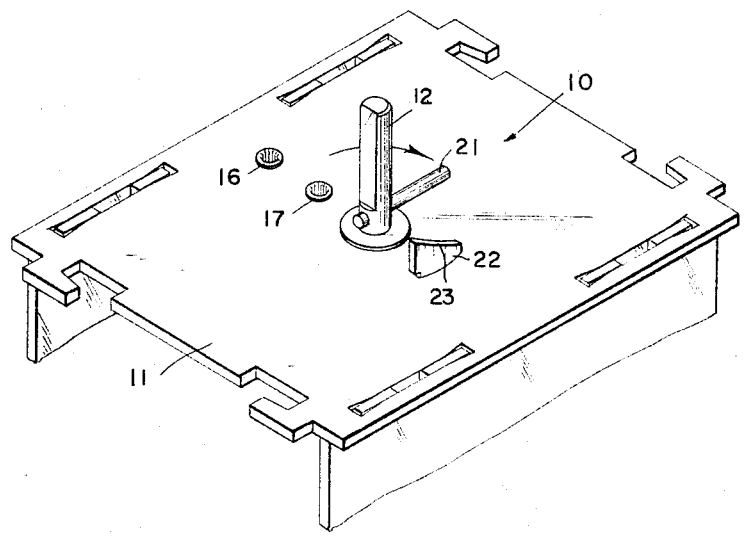
FIGURE 1 is a partial perspective view of the present invention illustrating the pin means and the cooperating ramp means.
Figure 2:
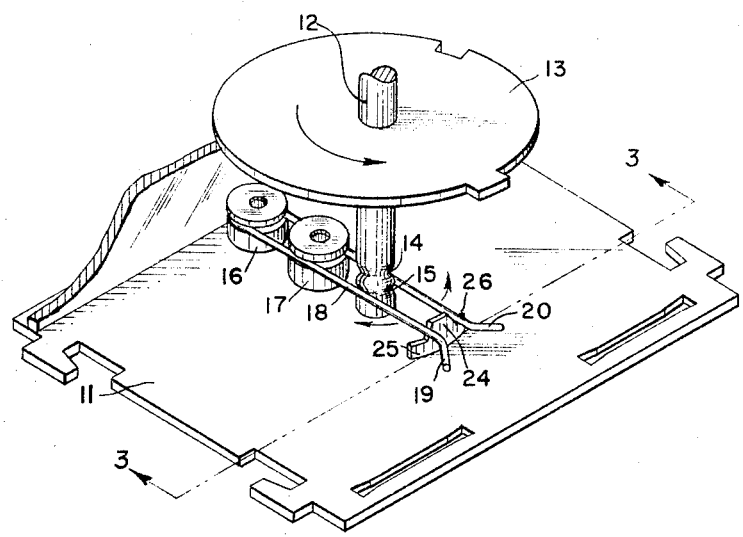
FIGURE 2 is a partial perspective view of the present invention showing the cooperation between the ramp means and the "hairpin" spring means.

Generally speaking, the present invention relates to a means and method for axially positioning a shaft, more particularly to the axial positioning of a shaft of a control timer. An apertured mounting plate is utilized to retain the components of an axial shaft positioning means. A shaft that is axially displaceable, is rotatably journaled in the mounting plate and projects therethrough. The shaft has formed therein two circumferential grooves that are utilized to index the shaft to the desired axial position. A "hairpin" shaped spring means is fixedly coupled to the mounting plate by any suitable means such as two mounting studs. The "hairpin" shaped spring means terminates in a pair of fingers, the fingers ride in the first one of the circumferential grooves as the shaft is rotated by a prime mover such as a synchronous timing motor. A ramp means is slidably interfitting with an arcuate aperture in the mounting plate. The ramp means is comprised of a ramp and of a wedge projection. A pin is fixedly coupled to the shaft at a right angle to the longitudinal axis of the shaft and is rotatable with the shaft. The pin engages the ramp means after the pin has been displaced through a predetermined arc. Upon continued rotational displacement of the shaft, the pin rides up the ramp thereby displacing the ramp means downwardly whereupon the wedge projection displaces the fingers of the "hairpin" spring means outwardly through a displacement as determined by the width of the wedge projection.

Additional arcuate displacement of the pin axially displaces the shaft outwardly. The displaced fingers of the "hairpin" spring means thereafter ride down the wedge projection to mate with the second circumferential groove.

Referring now to FIGURES 1–4 of the drawing which illustrate the preferred embodiment of the present invention comprising an axial shaft positioning means 10 mounted on end plate 11 of a control timer (not shown). Shaft 12 of the control timer (not shown) is coupled to and driven by a gear mechanism (not shown) which is coupled to and driven by a suitable prime mover (not shown) such as a synchronous timer motor or the like. Fixedly coupled to the shaft are a plurality of cams 13. Each cam has at least one follower arm (not shown) of a switch means riding on the periphery of the cam. The position of the follower arm is determinative of whether or not an electrical circuit associated with the follower arm is actuated. The cams are fixedly coupled to the shaft in spaced parallel relationship so that as the shaft is axially displaced there is no conflict between the follower arms and the adjacent cams.

A suitable line switch (not shown) is utilized to actuate the control timer. Any one of several different types of line switches may be used. One suitable type of line switch has a first contact carrying blade biased by one of cams 13 out of engagement with a second contact carrying blade thereby opening an electrical circuit between the control timer and an electrical source (not shown) when the shaft is in a first axial position. When the shaft is in a second axial position, the cam 13 no longer biases the first contact carrying blade out of engagement with the second contact carrying blade. The contact carrying blades engage thereby closing the electrical circuit between the source and the control timer energizing the control timer. It is emphasized that the disclosed line switch device is only one of several types of line switch means that could be used in cooperative association with the axial shaft positioning means of the present invention and as such its description is merely intended to facilitate the description of the present invention.

Extending through an aperture in the end plate and rotatably positioned therein is shaft 12. Disposed on shaft 12 is a pair of circumferential detent grooves 14 and 15. It is seen that the circumferential grooves are in spaced parallel relationship. Fixedly coupled to the end plate are a pair of mounting studs 16 and 17. A "hairpin" spring means 18 is carried by the mounting studs on the end plate at a predetermined position with respect to the shaft. Integrally formed on the "hairpin" spring means and located at the extremities opposite the U-shaped end are spring fingers 19 and 20. The fingers may include a V-shaped cross section or a circular cross section either of which are adapted to engage the circumferential grooves of the timer shaft. A pin 21 is fixedly coupled to the shaft at a right angle to the longitudinal axis of the shaft and is rotatable therewith. A ramp means 22 slidably interfits with an arcuate slot formed in end plate 11. The ramp means is comprised of ramp 23, a wedge projection 24, and flanges 25, 26 and 28. The wedge projection is located so that the projection fits between the fingers of the "hairpin" spring. It is seen that a rotational displacement of the shaft will cause pin 21 to engage ramp 23 during a predetermined portion of the arcuate displacement of the pin. In so doing, the pin rides up the ramp displacing the ramp means in a first vertical direction or downwardly. As the ramp means is displaced downwardly, wedge projection engages fingers of the "hairpin" spring thereby separating the fingers of the spring at a rate proportional to the downward displacement of the ramp means. After a predetermined downward movement, flange 28 engages the end plate thereby preventing further downward movement of the ramp means. The shaft is displaced upwardly as the pin proceeds to ride up the ramp. As disclosed hereinbefore, the fingers are separated so as not to engage the shaft, thus the displacement of the shaft proceeds requiring less force to displace the shaft upwardly than would be required if the fingers were not separated.

Figure 3:
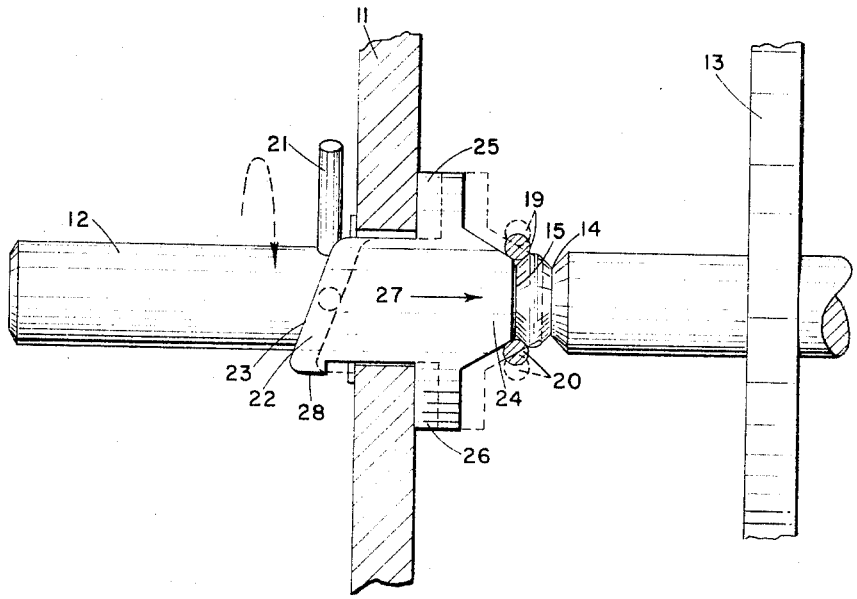
FIGURE 3 is an enlarged side view of the present invention taken across the lines 3—3 of FIGURE 2 illustrating the axial displacement of the ramp means and the displacement of the "hairpin" spring means in full and dotted lines respectively.
Figure 4:
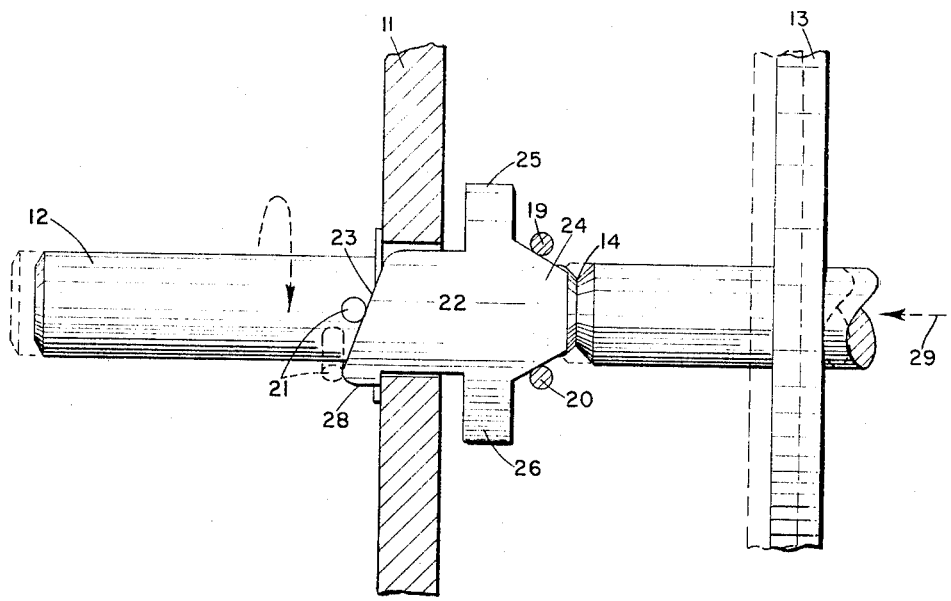
FIGURE 4 is an enlarged side view of the present invention taken across the lines 3—3 of FIGURE 2 illustrating the axial displacement of the shaft of the control timer in full and dotted lines respectively.

The operation of the axial shaft positioning means is illustrated in FIGURES 3 and 4 by the solid and dotted lines respectively. It is assumed that the device is in the normal or "off" position. To initiate a timing cycle, shaft 12 is pushed or displaced inwardly through the end plate a predetermined distance as determined by the components of the control timer. The shaft, pushed or displaced inwardly, actuates the control timer by closing the line switch as disclosed hereinbefore. In pushing the shaft inwardly fingers 19 and 20 of the "hairpin" spring means no longer ride in circumferential groove 14, the second circumferential groove, but rather ride in circumferential groove 15, the first circumferential groove, as illustrated by the solid lines of FIGURE 3. The shaft rotates in a clockwise direction in the normal manner with the plurality of cams 13 fixedly coupled to the shaft rotated in unison by the shaft. The cams operate their cooperating switches in accordance with the rise and fall contours of the peripheries of the respective cams. After a predetermined arcuate displacement, pin 21 engages the ramp portion 23 of the ramp means 22. It is seen that additional rotational displacement of the shaft will rotate the pin to the position shown by the dotted lines of FIGURE 3. As a result thereof the ramp means is displaced in the direction of arrow 27 as shown by the dotted lines of FIGURE 3. Likewise, the wedge projection 24 is displaced in the direction of arrow 27. The respective fingers of the "hairpin" spring are displaced outwardly, so as to disengage circumferential groove 15 as illustrated by the dotted lines of FIGURE 3. In assuming the position of the dotted lines, flange 28 of ramp means 22 engages end plate 11 thereby preventing additional displacement of the ramp means in the direction of arrow 27. As illustrated in FIGURE 4, additional accurate displacement of the pin displaces shaft 12 and associated cam 13 outwardly or in the direction of arrow 29. It is seen in FIGURE 4 that the fingers of the "hairpin" spring no longer engage the circumferential groove 15. The non-engagement allows the displacement of the shaft to take place without the fingers of the "hairpin" spring impeding the movement of the shaft in the direction of arrow 29 or outwardly. The outward movement of the shaft and associated cams is shown in dotted lines in FIGURE 4 as pin 21 proceeds to ascend ramp 23 of the ramp means. Upon attaining the apex of the ramp, the pin is further displaced in the direction of arrow 29 by the release of energy stored in a compression spring (not shown) that is used to spring bias the shaft in the direction of arrow 29. In so doing the line switch (not shown) is "opened" by the engagement of one of the cams with a blade (not shown) of the switch to thereby disengage the contacts of the contact carrying blades of the switch thus deenergizing the control timer. It is seen that the displacement of the shaft by the compression spring disengages the pin from the ramp surface. As disclosed hereinbefore fingers of the "hairpin" spring were displaced outwardly from their respective normal positions thereby storing energy. With the pin no longer engaging the ramp, the displaced fingers release the energy stored therein thereby displacing the wedge projection in the direction of arrow 29. The fingers remain in place with respect to a plane drawn perpendicular to the longitudinal axis of the shaft, however, the fingers slide down the ramp until the fingers interfit with the circumferential groove 14 as shown by the solid lines of FIGURE 3. It is seen that the control timer associated with the axial shaft positioning means is in an "off" position which was achieved automatically and by requiring a minimum of force to displace the shaft in the vertical direction.

While the invention is illustrated and described in its preferred embodiment, it will be understood that modifications and variations may be effected without departing from the scope of the novel concepts of this invention as set forth in the appended claims.

Having thus described my invention, I claim:

1. A shaft positioning means comprising: an apertured mounting plate; an axially displaceable shaft projecting through said mounting plate and rotatably journalled therein, said shaft including a plurality of grooves disposed thereon; bias means fixedly connected to said mounting plate and including a plurality of extremities, said extremities cooperating with a first one of said grooves; means slidably interfitting with said aperture in said plate and engageable therewith; and a projection connected to said shaft and rotatable therewith such that rotational displacement of said shaft causes said projection to engage with said means thereby slidably displacing said means in said aperture, said means engaging with said extremities of said bias means and displacing said extremities thereby storing energy therein, continued displacement of said projection causes said means to engage with said plate and axially displaces said shaft allowing said stored energy to be released thereby slidably displacing said means so that said extremities cooperate with another of said grooves.

2. A shaft positioning means comprising: an apertured mounting plate; an axially displaceable shaft projecting through said mounting plate and rotatably journalled therein, said shaft including a plurality of grooves disposed thereon; bias means fixedly connected to said mounting plate and including a plurality of extremities, said extremities cooperating with a first one of said grooves; ramp means slidably interfitting with said aperture in said plate and engageable therewith; and a projection connected to said shaft and rotatable therewith such that rotational displacement of said shaft causes said projection to engage with said ramp means thereby slidably displacing said ramp means in said aperture, said ramp means engaging with said extremities of said bias means and displacing said extremities thereby storing energy therein, continued displacement of said projection causes said ramp means to engage with said plate and axially displaces said shaft allowing said stored energy to be released thereby slidably displacing said ramp means so that said extremities cooperate with another of said grooves.

3. A shaft positioning means comprising: an apertured mounting plate; an axially displaceable shaft projecting through said mounting plate and rotatably journalled therein, said shaft including a plurality of grooves disposed thereon; bias means fixedly connected to said mounting plate and including a plurality of fingers, said fingers interfitting with a first one of said grooves; ramp means slidably interfitting with said aperture in said plate, said ramp means including a stop means engaging with said mounting plate after predetermined displacement of said ramp means in said aperture; and a projection connected to said shaft and rotatable therewith such that rotational displacement of said shaft causes said projection to engage with said ramp means thereby slidably displacing said ramp means in said aperture, said ramp means engaging with said fingers of said bias means and displacing said fingers thereby storing energy therein, continued displacement of said projection causes said stop means to engage with said plate thereby preventing further displacement of said ramp means in said aperture, thereafter said projection axially displaces said shaft allowing said stored energy to be released thereby slidably displacing said ramp means so that said fingers interfit with another of said grooves.

4. A shaft positioning means comprising: an apertured mounting plate; an axially displaceable shaft projecting through said mounting plate and rotatably journalled therein, said shaft including first and second circumferential grooves disposed thereon; bias means fixedly connected to said mounting plate and including a plurality of fingers, said fingers interfitting with said first one of said grooves; ramp means slidably interfitting with said aperture in said plate, said ramp means including a stop means engaging with said mounting plate after predetermined displacement of said ramp means in said aperture; and a pin connected to said shaft and rotatable therewith such that rotational displacement of said shaft causes said pin to engage with said ramp means thereby slidably displacing said ramp means in said aperture, said ramp means engaging with said fingers of said bias means and displacing said extremities thereby storing energy therein, continued displacement of said pin causes said stop means to engage with said plate thereby preventing further displacement of said ramp means in said aperture, thereafter said pin axially displaces said shaft allowing said stored energy to be released thereby slidably displacing said ramp means so that said fingers interfit with said second groove.

5. A shaft positioning means comprising: an apertured mounting plate; an axially displaceable shaft projecting through said mounting plate and rotatably journalled therein, said shaft including first and second circumferential grooves disposed thereon; bias means fixedly connected to said mounting plate and including a plurality of fingers, said fingers interfitting with said first one of said grooves; ramp means slidably interfitting with said aperture in said plate, said ramp means including a stop means engaging with said mounting plate after predetermined displacement of said ramp means in said aperture; and a pin connected to said shaft and rotatable therewith such that rotational displacement of said shaft causes said pin to engage with said ramp means thereby slidably displacing said ramp means in said aperture, said ramp means engaging with said fingers of said bias means and displacing said extremities thereby storing energy therein, continued displacement of said pin causes said stop means to engage with said plate thereby preventing further displacement of said ramp means in said aperture, thereafter said pin axially displaces said shaft allowing said stored energy to be released thereby slidably displacing said ramp means and axially displacing said shaft so that said fingers interfit with said second groove.

6. A shaft positioning means comprising: an apertured mounting plate; an axially displaceable shaft projecting through said mounting plate and rotatably journalled therein, said shaft including first and second circumferential grooves disposed thereon; spring means fixedly connected to said mounting plate and including a plurality of spring fingers, said fingers interfitting with said first one of said grooves; ramp means slidably interfitting with said aperture in said plate, said ramp means including a stop means engaging with said mounting plate after predetermined displacement of said ramp means in said aperture; and a pin connected to said shaft and rotatable therewith such that rotational displacement of said shaft causes said pin to engage with said ramp means thereby slidably displacing said ramp means in said aperture, said means engaging with extremities of said spring fingers and displacing said extremities thereby storing energy therein, continued displacement of said pin causes said stop means to engage with said plate thereby preventing further displacement of said ramp means in said aperture, thereafter said pin axially displaces said shaft allowing said stored energy to be released thereby slidably displacing said ramp means and axially displacing said shaft so that said fingers interfit with said second groove.

7. A shaft positioning means comprising: an apertured mounting plate; an axially displaceable shaft projecting through said mounting plate and rotatably journalled therein, said shaft including first and second circumferential grooves disposed thereon; hairpin spring means fixedly connected to said mounting plate and including two spring fingers, said fingers mating with said first one of said grooves; ramp means slidably interfitting with said aperture in said plate, said ramp means including a stop means engaging with said mounting plate after predetermined displacement of said ramp means in said aperture; and a pin connected to said shaft and rotatable therewith such that rotational displacement of said shaft causes said pin to engage with said ramp means thereby slidably displacing said ramp means in said aperture, said means engaging with extremities of said spring fingers and displacing said extremities thereby storing energy therein, continued displacement of said pin causes said stop means to engage with said plate thereby preventing further displacement of said ramp means in said aperture, thereafter said pin displaces said shaft allowing said stored energy to be released thereby slidably displacing said ramp means and axially displacing said shaft so that said fingers mate with said second groove.

8. A shaft positioning means comprising: an apertured mounting plate; an axially displaceable shaft projecting through said mounting plate and rotatably journalled therein, said shaft including first and second circumferential grooves disposed thereon; hairpin spring means fixedly connected to said mounting plate and including two spring fingers, said fingers mating with first one of said grooves; ramp means slidably interfitting with said aperture in said plate, said ramp means including a ramp, a wedge projection and a stop flange, said flange engaging with said mounting plate after predetermined displacement of said ramp means in said aperture; and a pin connected to said shaft and rotatable therewith such that rotational displacement of said shaft causes said pin to engage with said ramp, said pin riding up said ramp thereby slidably displacing said ramp means downwardly in said aperture, said wedge projection engaging with said extremities of said spring fingers and displacing said extremities outwardly from said first groove thereby storing energy therein, continued displacement of said pin causes said stop flange to engage with said plate thereby preventing further displacement of said ramp means in said aperture, thereafter said pin displaces said shaft as said pin continues to ride up said ramp allowing said stored energy to be released thereby slidably displacing said ramp means and axially displacing said shaft so that said fingers mate with said second groove.

9. A shaft positioning means comprising: an apertured mounting plate; an axially displaceable shaft projecting through said mounting plate and rotatably journalled therein, said shaft including a plurality of grooves disposed thereon; a compression spring means carried by said shaft and biasing said shaft in a predetermined direction; bias means fixedly connected to said mounting plate and including a plurality of extremities, said extremities cooperating with a first one of said grooves; ramp means slidably interfitting with said aperture in said plate; and a projection connected to said shaft and rotatable therewith such that rotational displacement of said shaft causes said projection to engage with said ramp means thereby slidably displacing said ramp means in said aperture, said ramp means engaging with said extremities of said bias means and displacing said extremities thereby storing energy therein, continued displacement of said projection displaces said shaft allowing said stored energy of said compression spring means and said bias means to be released thereby slidably displacing said ramp means and said shaft in said predetermined direction so that said extremities cooperate with another of said grooves.

10. A shaft positioning means comprising: an apertured mounting plate; an axially displaceable shaft projecting through said mounting plate and rotatably journalled therein, said shaft including first and second circumferential grooves disposed thereon; a compression spring means carried by said shaft and biasing said shaft in a predetermined direction; hairpin spring means fixedly connected to said mounting plate and including two spring fingers, said fingers mating with first one of said grooves; ramp means slidably interfitting with said aperture in said plate, said ramp means including a ramp, a wedge projection and a stop flange, said flange engaging with said mounting plate after predetermined displacement of said ramp means in said aperture; and a pin connected to said shaft and rotatable therewith such that rotational displacement of said shaft causes said pin to engage with said ramp, said pin riding up said ramp thereby slidably displacing said ramp means downwardly in said aperture, said wedge projection engaging with said extremities of said spring fingers and displacing said extremities outwardly from said first groove thereby storing energy therein, continued displacement of said pin causes said stop flange to engage with said plate thereby preventing further displacement of said ramp means in said aperture, thereafter said pin displaces said shaft as said pin continues to ride up said ramp allowing said stored energy of said compression spring means and of said fingers to be released thereby slidably displacing said ramp means and axially displacing said shaft so that said fingers mate with said second groove.

References Cited by the Examiner
UNITED STATES PATENTS

| | | | |
|---|---|---|---|
| 1,416,994 | 5/1922 | Stoner | 74—527 X |
| 2,045,041 | 6/1936 | McNicoll | 74—3.52 |
| 2,688,884 | 9/1954 | Warmoes et al. | 74—470 |
| 2,810,050 | 10/1957 | Johnson. | |
| 2,829,524 | 4/1958 | Simpson | 74—10.41 |
| 2,926,033 | 2/1960 | Zarrillo | 287—52.05 |
| 2,940,333 | 6/1960 | Bowman | 74—527 |
| 2,964,933 | 12/1960 | Fritz | 68—12 |
| 2,971,143 | 2/1961 | Stilwell | 68—12 X |
| 3,154,967 | 11/1964 | Voland. | |

FOREIGN PATENTS 19,840   1906   Great Britain.

FRED C. MATTERN, JR., *Primary Examiner.*

BROUGHTON G. DURHAM, *Examiner.*

C. F. GREEN, *Assistant Examiner.*